(12) United States Patent
Martz et al.

(10) Patent No.: US 11,772,501 B2
(45) Date of Patent: Oct. 3, 2023

(54) UNMANNED UNDERSEA VEHICLE WITH MODULAR BATTERY SYSTEM

(71) Applicant: L3Harris Technologies, Inc., Melbourne, FL (US)

(72) Inventors: Jennifer Martz, Middleboro, MA (US); Kevin W. Ludlam, Marlborough, MA (US); Jason D. Aiello, Fairhaven, MA (US); Daryl B. Slocum, La Mesa, CA (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 286 days.

(21) Appl. No.: 16/876,988

(22) Filed: May 18, 2020

(65) Prior Publication Data

US 2021/0276432 A1 Sep. 9, 2021

Related U.S. Application Data

(60) Provisional application No. 62/875,438, filed on Jul. 17, 2019.

(51) Int. Cl.
*B60L 50/00* (2019.01)
*B60L 50/60* (2019.01)
*B60L 53/80* (2019.01)
*B63G 8/08* (2006.01)
*B60L 58/12* (2019.01)
*B63G 8/00* (2006.01)

(52) U.S. Cl.
CPC ............... *B60L 50/66* (2019.02); *B60L 53/80* (2019.02); *B60L 58/12* (2019.02); *B63G 8/08* (2013.01); *B60L 2240/54* (2013.01); *B63G 2008/002* (2013.01)

(58) Field of Classification Search
CPC ....... B60L 11/1851; B60L 50/66; B60L 58/12
See application file for complete search history.

(56) References Cited

U.S. PATENT DOCUMENTS

| | | | | |
|---|---|---|---|---|
| 5,433,164 | A * | 7/1995 | Sneath | B63C 11/46 114/315 |
| 7,213,532 | B1 * | 5/2007 | Simpson | B63C 11/42 114/333 |
| 8,332,836 | B2 * | 12/2012 | Jamerson | H01M 10/42 717/172 |
| 9,469,394 | B2 * | 10/2016 | Vaughn | A63H 27/12 |
| 2004/0182302 | A1 * | 9/2004 | McNally | B63B 17/0018 114/312 |
| 2008/0127878 | A1 * | 6/2008 | Marion | B63B 43/12 114/337 |
| 2011/0175604 | A1 * | 7/2011 | Polzer | G01R 33/022 324/246 |
| 2013/0116868 | A1 * | 5/2013 | Erko | B60W 10/26 320/109 |

(Continued)

*Primary Examiner* — Adi Amrany
(74) *Attorney, Agent, or Firm* — Workman Nydegger

(57) ABSTRACT

An underwater vehicle includes a modular battery system. The modular battery system includes at least one removable battery tray. The modular battery system further includes a battery tray system configured to hold at least one removable battery tray. The modular battery system further includes a controller coupled to the at least one removable battery tray that is configured to detect the battery chemistry of the at least one removable battery tray.

20 Claims, 8 Drawing Sheets

(56) References Cited

U.S. PATENT DOCUMENTS

| | | | |
|---|---|---|---|
| 2014/0198609 A1* | 7/2014 | Welker | B63C 11/52 |
| | | | 367/16 |
| 2014/0272475 A1* | 9/2014 | Morash | B63G 8/00 |
| | | | 429/6 |
| 2014/0277887 A1* | 9/2014 | Slattery | B60L 58/21 |
| | | | 701/22 |
| 2015/0114733 A1* | 4/2015 | Chang | H01M 50/20 |
| | | | 180/68.5 |
| 2016/0214693 A1* | 7/2016 | Habeger | B63G 8/20 |
| 2018/0086222 A1* | 3/2018 | Juang | G06N 3/0454 |
| 2018/0337378 A1* | 11/2018 | Stephens | B60L 50/66 |
| 2019/0100090 A1* | 4/2019 | Matecki | B60K 1/04 |
| 2020/0400117 A1* | 12/2020 | McEntee | F03B 17/067 |

\* cited by examiner

UNMANNED UNDERSEA VEHICLE WITH MODULAR BATTERY SYSTEM

CROSS-REFERENCE TO RELATED APPLICATIONS

This application claims the benefit of and priority to U.S. Provisional Patent Application Ser. No. 62/875,438 filed on Jul. 17, 2019 and entitled "UNMANNED UNDERSEA VEHICLE WITH MODULAR BATTERY SYSTEM," which application is expressly incorporated herein by reference in its entirety.

BACKGROUND

Unmanned undersea vehicles (also known as unmanned underwater vehicles, underwater drones, or UUVs) are vehicles that operate underwater without a human occupant. Typically, unmanned undersea vehicles are divided into two categories, remotely operated underwater vehicles (also known as ROVs), and autonomous underwater vehicles (also known as AUVs). Where the former is controlled by a remote human operator and the latter operates independently of human input. Note that some UUVs may be at different times ROVs and AUVs, or may have autonomous aspects combined simultaneously with remote operated aspects.

In general, UUVs are battery powered. Batteries must be recharged and/or replaced regularly. Recharging or replacing batteries is often cumbersome, time consuming, and inconvenient. This is particularly true of UUV environments where the batteries are typically encased in a water-tight, sealed portion of a UUV. Further, if batteries are not connected properly, the battery itself or other electrical components connected to the battery may be damaged. Further still, battery size, weight, and weight distribution affects buoyancy and center of mass of the UUV.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an underwater vehicle comprising a modular battery system. The modular battery system includes at least one removable battery tray. The modular battery system further includes a battery tray system configured to hold at least one removable battery tray. The modular battery system further includes a controller coupled to the at least one removable battery tray that is configured to detect the battery chemistry of the at least one removable battery tray.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1b illustrates a perspective view of an exemplary joiner clamp of FIG. 1a;

FIG. 1c illustrates a perspective view of an exemplary quick release bow clamp of FIG. 1a;

FIG. 1d illustrates a perspective view of an exemplary drive motor of FIG. 1a;

DETAILED DESCRIPTION

Embodiments disclosed herein comprise apparatuses, systems, components, and methods for unmanned undersea vehicles. These unmanned undersea vehicles can be used to carry payloads and software packages to detect, classify, localize, identify, and/or retrieve targets. In particular, disclosed embodiments may be designed to meet certain constraints. For example, in some embodiments, such unmanned undersea vehicles are designed to be less than 240 pounds, operate at 1000 feet below the surface of a body of water, be less than 99 inches in length, and/or be less than 9 inches in diameter. Indeed, in some embodiments, such unmanned undersea vehicles may be configured to be used in torpedo tubes of various watercraft.

Embodiments illustrated herein may include components that help to meet certain corrosion resistance requirements. Alternatively, or additionally, embodiments may include components configured to meet certain buoyancy requirements. The unmanned undersea vehicle may include a modular battery system. The modular battery system may include removable battery trays.

One or more of the following examples is provided with respect to an "underwater vehicle." One will understand that the usage of an "underwater vehicle" is merely for the sake of convenience and that the present invention applies equally to all unmanned undersea vehicle platforms.

Unmanned Undersea Vehicle

Figure 1A:
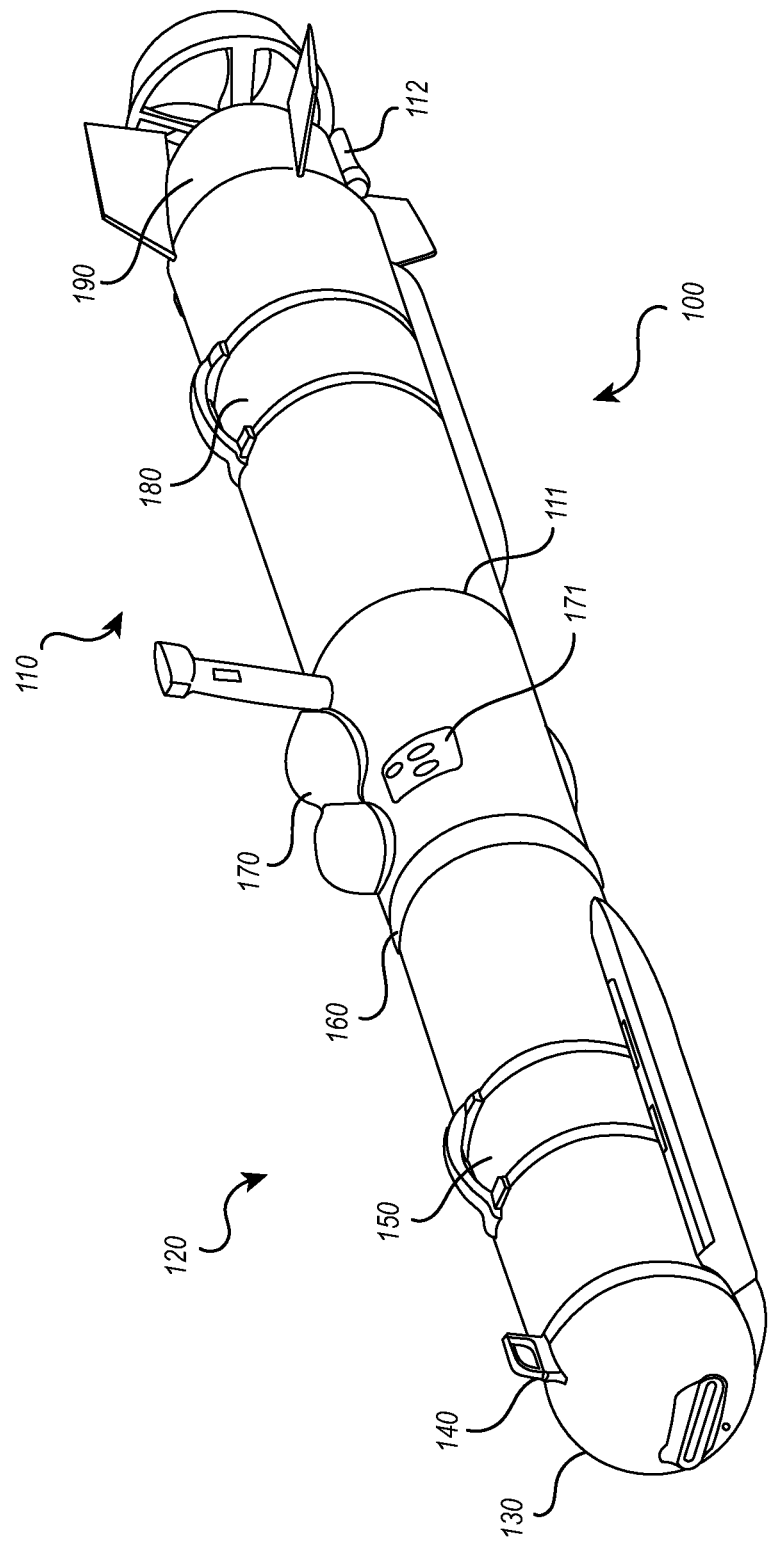
FIG. 1a illustrates a perspective view of an exemplary unmanned undersea vehicle.
Figure 1B:
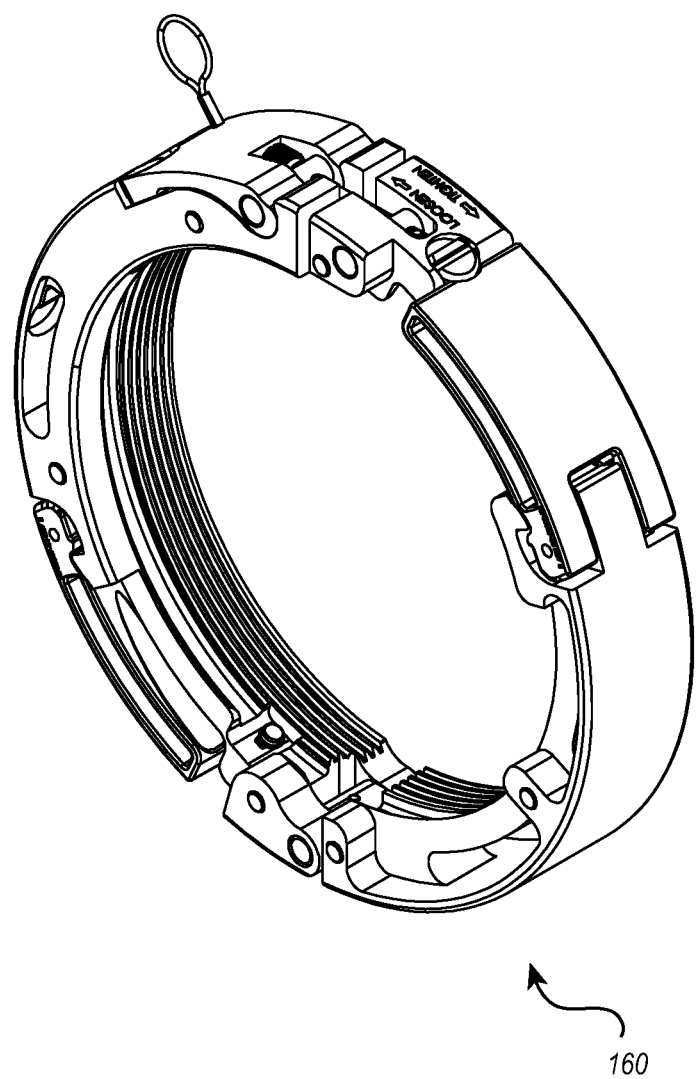

FIG. 1a illustrates an exemplary underwater vehicle 100 that comprises an aft section 110 and a forward section 120 attached by a joiner clamp 160 (see FIG. 1*b*). In some embodiments, the forward section 120 may include a quick release bow clamp 140 (see FIG. 1*c*), thereby allowing section 130 to be completely or partially removed from section 150.

Alternatively, or additionally, the aft section 110 may include a drive motor 190 (see FIG. 1*d*) and/or a secure data pod 171. The aft section 110 may be completely or partially separated into smaller components at junctions 111 and 112, thereby allowing section 170 to be completely or partially separated from section 180, and alternatively, or additionally, allowing section 180 to be completely or partially separated from the drive motor 190.

The underwater vehicle 100 and the components therein typically require electrical power for proper operation. For example, the drive motor 190 requires electrical power to power rotor and/or stator coils to cause a rotor to rotate to cause propulsion blades to propel the underwater vehicle 100. Power may be required for steering. Power may be required to read and write data to the secure data pod 171. Indeed, power is typically needed for the large majority of underwater vehicle operations. Often, this power is provided by one or more batteries.

Figure 2:
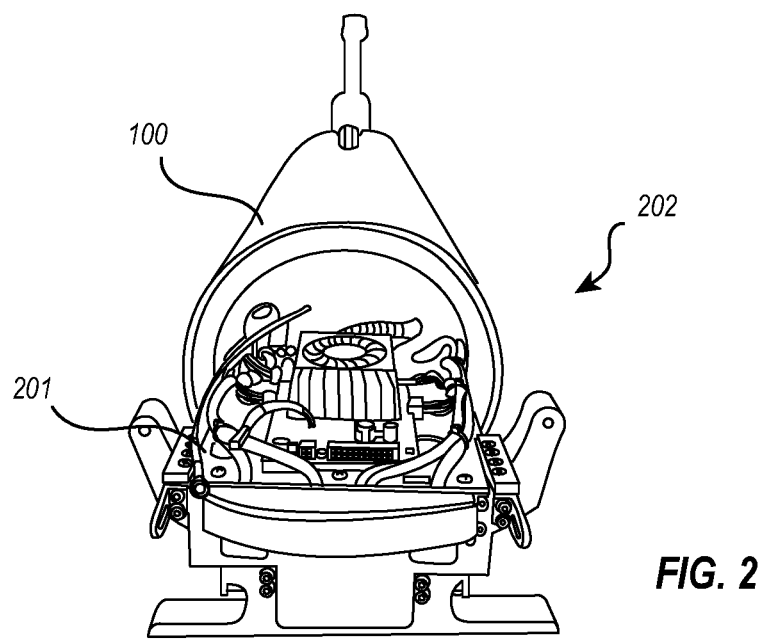
FIG. 2 illustrates an exemplary removable battery tray.

In some embodiments, the underwater vehicle 100 may include a modular battery system that includes at least one removable battery tray 201, shown in FIG. 2, wherein a removable battery tray is enclosed in section 150, section 170, section 180, or combinations thereof. In particular, the battery tray 201 can be slid into a battery rail system included in the chassis of the vehicle 100 such as that shown in FIG. 7. It should be appreciated that in some embodiments not all sections 150, 170, and 180 will include removable battery trays. Rather, in some embodiments, only a single section will include a removable battery tray, and the other sections can include controls, a payload, ballast, buoyant foam, or other elements. It should further be noted that sections may include a battery tray, as well as other elements. For example, in some embodiments, the aft section 110 may include vehicle control elements in addition to a battery tray. In some embodiments, a 2 kWh lithium-ion battery tray is included in the aft section 110. Alternatively or additionally, the forward section 120 may include user payload, a CPU, and a battery tray. In some such embodiments, a 2 kWh lithium-ion battery tray is included in the forward section 120. As will be illustrated in more detail below, optional sections, such as an optional battery section 401 may be added to the vehicle 100 to add additional battery power. In one such example, a 30 inch optional battery section is included having a 2 to 3 kWh lithium-ion battery tray.

As discussed previously, various user payloads can be included together in a section with or without a battery tray. One such payload includes a retractable mast. Another payload includes a bottom profiler. Another payload includes location hardware such as GPS or other geo-locating hardware. Another payload includes sonar. Such sonar may be for example gap fill sonar and/or forward look, multi-beam sonar. Another payload includes multibeam bathymetry hardware. Another payload includes one or more cameras, such as visible light cameras, IR cameras, etc. Another payload includes a sound velocity probe. Another payload includes a directional acoustic transponder.

Some embodiments include an open system interface which allows for users to easily integrate their own sensors and controls in the vehicle 100. For example, the IVER3 available from L3-Harris Corporation includes a remote helm design which includes a separate CPU, which allows users to install their own operating system that can connect to added hardware. The separate CPU communicates with a vehicle control CPU through a serial port via a rich set of commands for remote helm control. The IVER3 vehicle provides physical connections and space inside the forward section for user electronics as well as penetrations to make connections to external sensors.

Often, the payloads are included and configured to detect, classify, localize, identify, and/or recover targets. For example, embodiments can be used for target recovery such as equipment and/or victim recovery.

The payloads can be used to implement sensors which can detect the presence of a target. For example, sensors can detect an anomaly underwater and/or in the floor of a body of water. Additional sensors can be used to obtain additional information about the target to classify characteristics (such as density, shape, temperature, etc.) of the target. Using the detected characteristics, on-board computing system may be able to identify the target with particularity. For example, the systems may be able to determine that the target is a particular piece of equipment. In some embodiments, the payloads may include robotic arms, sample scoops, or other equipment that can be used to recover the target. Many, if not most of these payloads require power from the internal battery trays included in the vehicle.

The underwater vehicle 100 may, in some embodiments, allow for removable battery trays 201 of different chemistries to be used. For example, some embodiments may use nickel metal hydride rechargeable batteries. Alternatively, embodiments may use primary alkaline batteries. Alternatively, embodiments may use lithium-ion rechargeable batteries.

Selection of battery chemistry may be dependent on a number of different factors. For example, certain battery chemistries provide power for longer periods of time than other battery chemistries having a similar mass. Illustratively, based on representative missions and transit speeds of a particular representative underwater vehicle, nickel metal hydride rechargeable batteries of one particular mass have an endurance estimate of 20 hours, having an energy storage of 2 kilowatt hours. For the particular representative underwater vehicle, primary alkaline batteries having a similar mass have an endurance estimate of 30 hours, having an energy storage of 3 kilowatt hours. For the particular representative underwater vehicle, lithium-ion rechargeable batteries have an endurance estimate of 40 hours, having an energy storage of 4 kilowatt hours. Note that other configurations, including different sizes and masses, different vehicle configurations, etc., may have different endurances from the battery trays. Thus, it can be seen that one factor in selecting a battery chemistry may be related to needed endurance for a particular application.

Certain battery chemistries may take a longer time to recharge than other battery chemistries. Thus, another factor that may be used when selecting a battery chemistry relates to recharge time.

Alternatively, or additionally, certain battery chemistries may be more expensive than other battery chemistries. Thus, yet another factor that may be used when selecting a battery chemistry relates to cost.

Alternatively, or additionally, certain battery chemistries may be prohibited by certain regulatory or other administrative requirements. For example, the United States Department of Transportation prohibits certain transport of lithium-ion batteries. Thus, if the vehicle 100 is intended to be transported in certain fashions, alternative chemistries will need to be selected than lithium-ion.

Thus, depending on the use and/or need of the underwater vehicle 100, an appropriate battery chemistry may be selected.

Some embodiments illustrated herein include the ability to handle multiple different battery chemistries in an individual underwater vehicle 100. In particular, different battery chemistries have different charging and/or discharging modalities and thus controllers must function differently depending on the battery chemistry of the removable batteries 201 used in the underwater vehicle 100. For example, batteries must be charged and discharged below certain rates depending on their chemistries to prevent fire and/or to prevent damaging the batteries. In particular, certain chemistries may be safely charged and discharged at faster rates than other chemistries. Further, battery charging may be monitored to determine if charging rate can be increased or must be decreased. However, this monitoring is dependent on the particular chemistry of the batteries being charged.

For example, in some embodiments, the battery monitoring is done via a microprocessor which communicates with the electronics within the battery to monitor voltage, current (either into or out of the battery), temperature, and capacity. The microprocessor can adjust the charging voltage and current based on information provided by the battery. The microprocessor is also capable of providing the battery information and status to a host system if desired.

Figure 5:
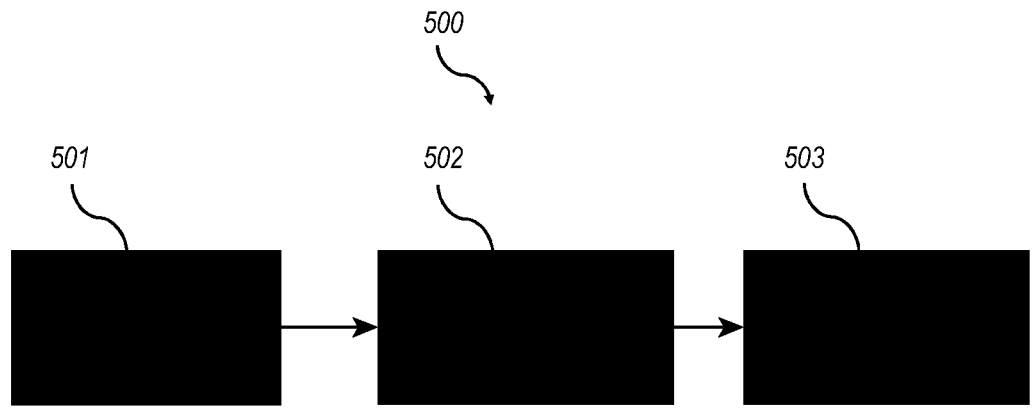
FIG. 5 illustrates a flowchart comprising steps in an embodiment of a method for determining the chemistry of a removable battery tray.

More specifically, as illustrated in FIG. 5, a controller 310 may implement a method 500 through at least one processor and computer executable instruction stored on computer readable media. In some embodiments, the method 500 may include an act 501 of detecting a removable battery 201. The method 500 implemented by the controller 310 may further include an act 502 of determining the chemistry of a removable battery 201. The method 500 implemented by the controller 310 may further include an act 503, wherein the controller 310 selects an appropriate charging modality to apply to the removable battery 201.

In some embodiments, the charging modality may include a trickle charge, a shallow charge, a cycled charge, or any other means or combination of charging a battery, where the modality is generally dependent on the detected battery chemistry. In one embodiment, the controller 310 may be configured to adjust and/or change the type of charging modality being applied to the removable battery 201.

Embodiments of the underwater vehicle 100 may allow the removable battery trays 201 to be swappable within the various sections 150, 170, and/or 180 (or 401 as will be illustrated in more detail below). Examples of this are illustrated with reference to FIG. 2, which illustrates a removable battery tray 201 being slid into a section of the underwater vehicle 100 on a battery tray rail system included as part of the chassis as illustrated in the partial chassis assembly 700 (see FIG. 7). In one embodiment, the battery tray rail system allows for the changing of battery chemistries in less than six hours in a controlled environment.

Figure 1C:
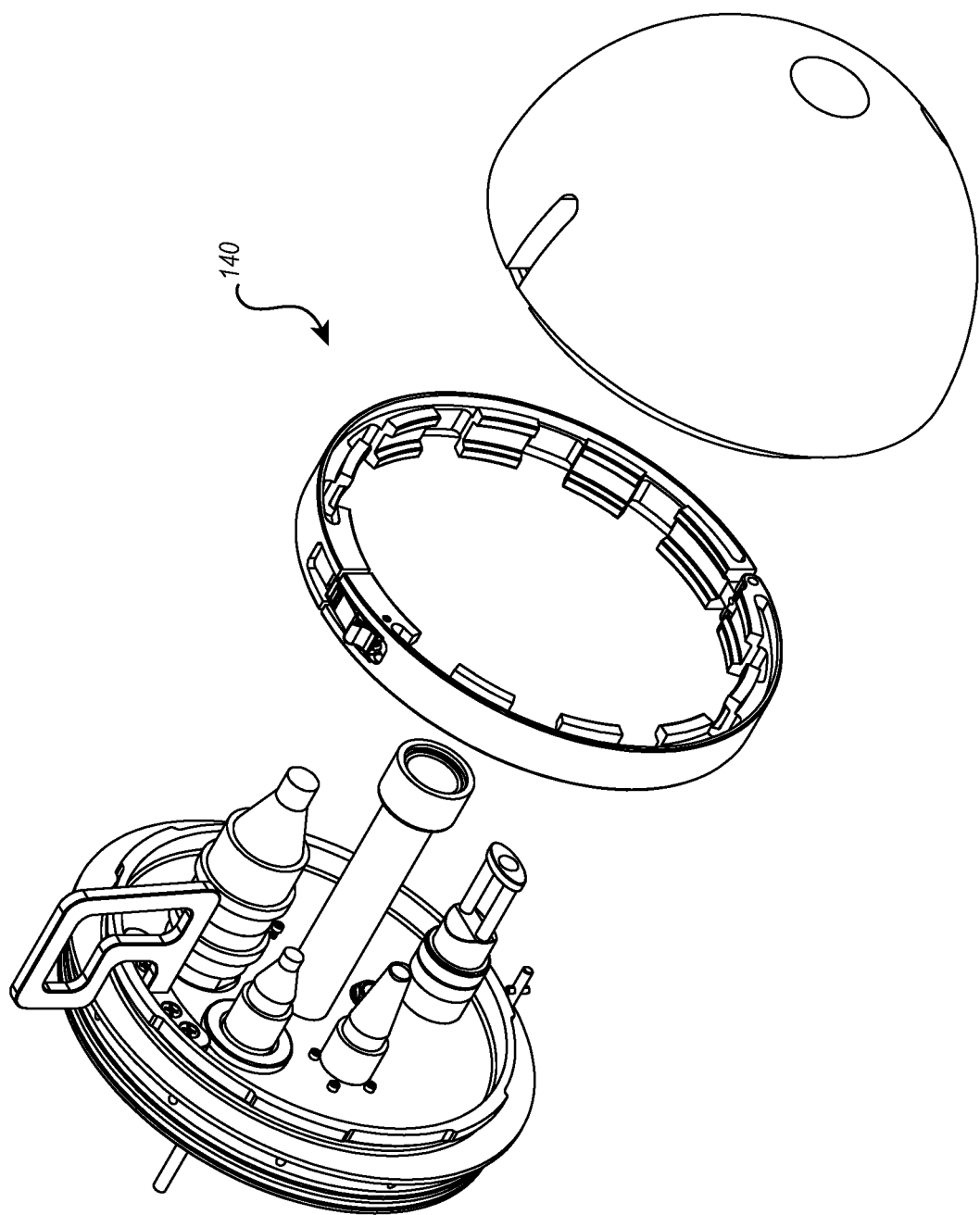
Figure 1D:
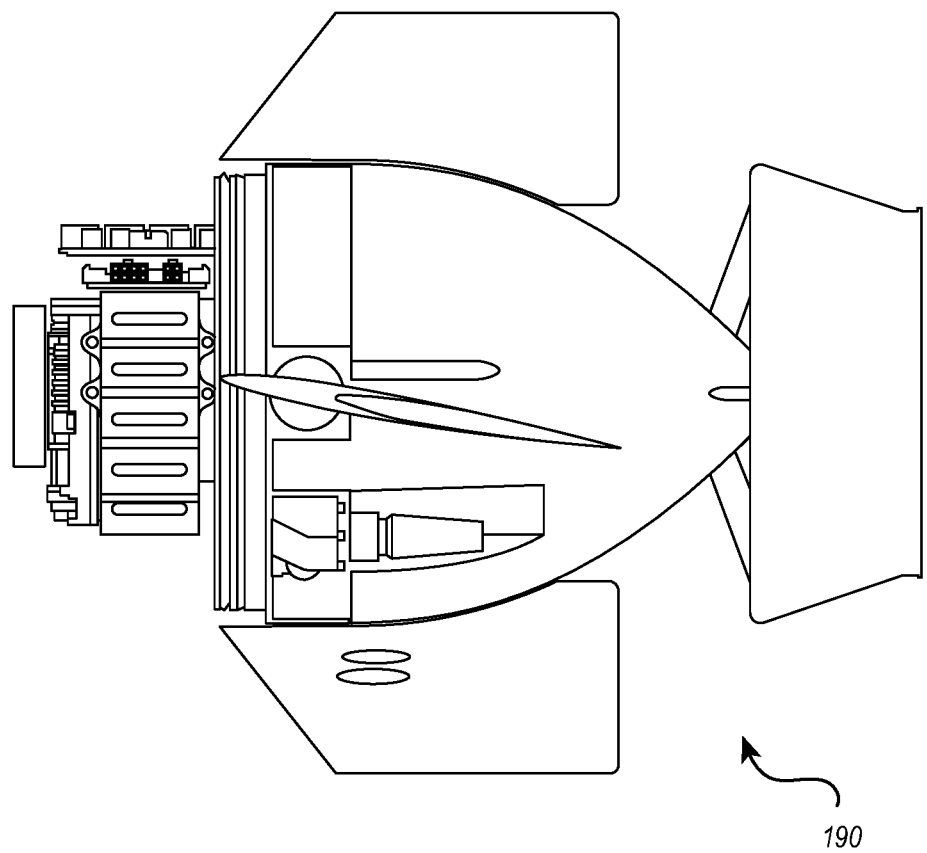

In one embodiment, once the battery tray rail system is properly placed in one of the various sections 150, 170, and/or 180, and the underwater vehicle 100 is properly assembled, the underwater vehicle 100 is vacuum purged, vacuum tested, and nitrogen back filled for operation. This vacuum and backfilling operation can be performed using a valve as illustrated in FIG. 1c.

Figure 7:
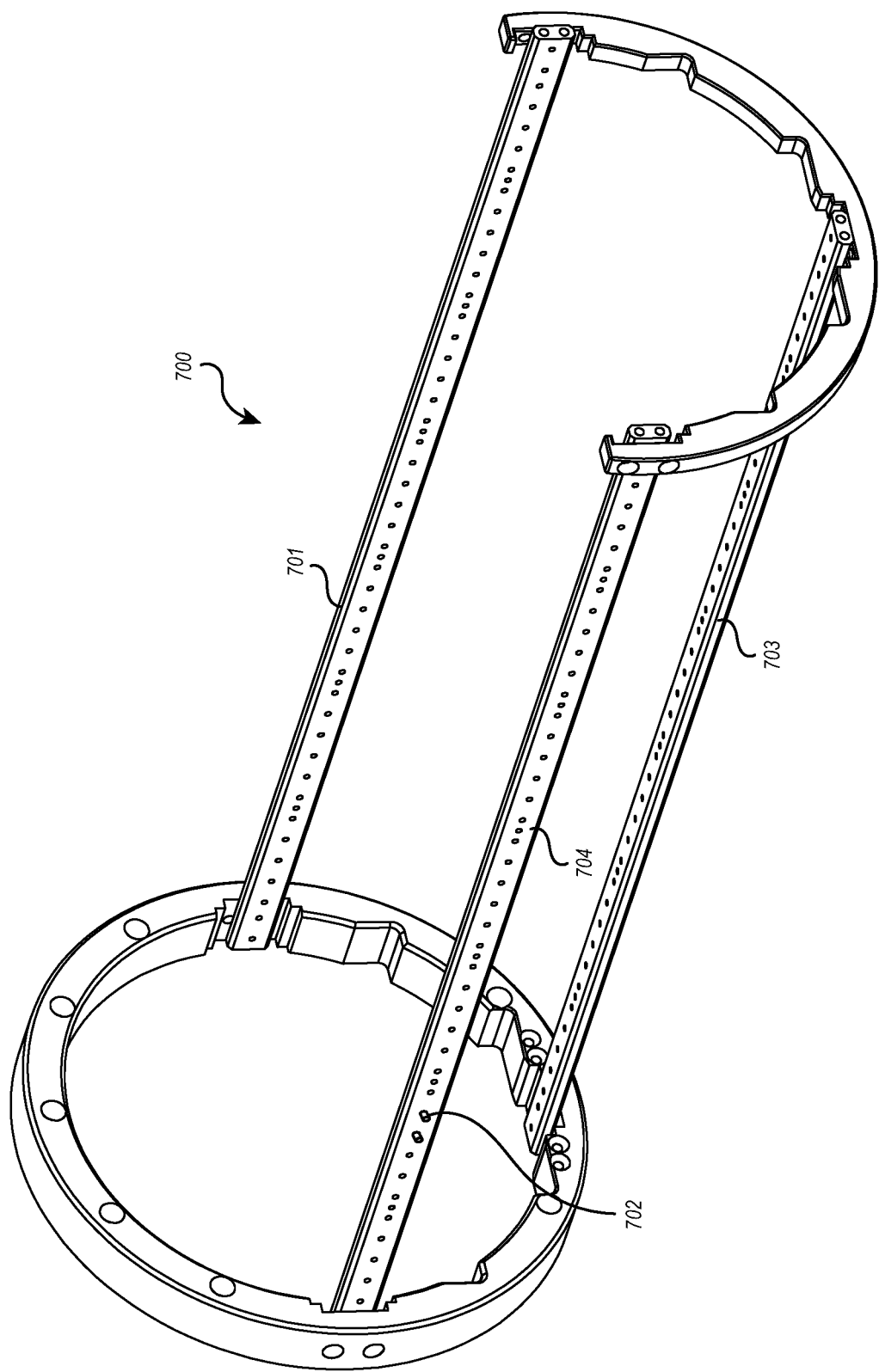
FIG. 7 illustrates a partial chassis frame assembly.

Some embodiments of the partial chassis assembly 700 may include a ballast control system 701. FIG. 7 depicts one example of the partial chassis assembly 700. In this particular example the partial chassis assembly 700 includes a ballast control system 701. In some embodiments, the ballast control system 701 may be used to configure the ballast of the underwater vehicle 100. Alternatively, or additionally, the ballast control system 701 may be used to control the balance of the underwater vehicle 100. In one embodiment, the ballast control system 701 comprises a series of holes spaced along one or more rails 704 of the ballast control system 701 and configured to selectively receive weighted plugs to facilitate balancing and/or controlling ballast for the vehicle 100. The ballast control system 701 is one or more plugs 702 in corresponding holes 703 as needed to obtain balance and/or ballast goals. The plug 702, in some embodiments may include a weighted material. In some examples, the plug 702 may include lead, or other mass dense material. In some embodiments, at least one plug 702 is inserted into a hole 703 to increase the mass of the partial chassis assembly 700. When using a battery of a different chemistry, it may be desirable to increase or decrease the mass of the partial chassis assembly 700 so that the vehicle 100 has a similar mass when various different battery chemistries are used. In particular, weight can be added for lighter battery chemistries, and added for heavier battery chemistries.

In particular, the mass and weight distribution of the vehicle 100 is typically taken into account when designing the vehicle 100. For example, often the vehicle 100 will have weight distributed in the vehicle 100 to ensure that the vehicle is naturally level when deployed in a working environment. That is, when the vehicle 100 is deployed into a water environment, it is desirable that the vehicle is essentially parallel to the surface of the water. This allows for conserving energy and battery life due to the fact that additional propulsion does not need to be applied to level the vehicle 100 when deployed. Further, this simplifies navigation of the vehicle 100.

Thus, in some embodiments, a standard battery module mass and weight distribution may be designed. This mass and weight distribution may match, or be based on, a particular battery chemistry. When other battery chemistries are used, additional ballast can be added or removed in an appropriate fashion to the ballast control system 701 to achieve the standard battery module mass and weight distribution. Alternatively, or additionally, the standardized battery module mass and weight distribution may simply be designed irrespective of battery chemistry, and ballast may be added to, or removed from, the ballast control system 701 with any battery chemistry to meet the standard battery module mass and weight distribution.

In other embodiments, the ballast control system may be used to compensate for imbalances caused by payloads in the underwater vehicle 100. For example, and as illustrated above, a user may implement a custom payload in the vehicle 100. In embodiments where no restrictions are placed on the weight mass and weight distributions of those payloads, ballast can be added to the ballast control system 701 to appropriately balance the vehicle 100.

Figure 3:
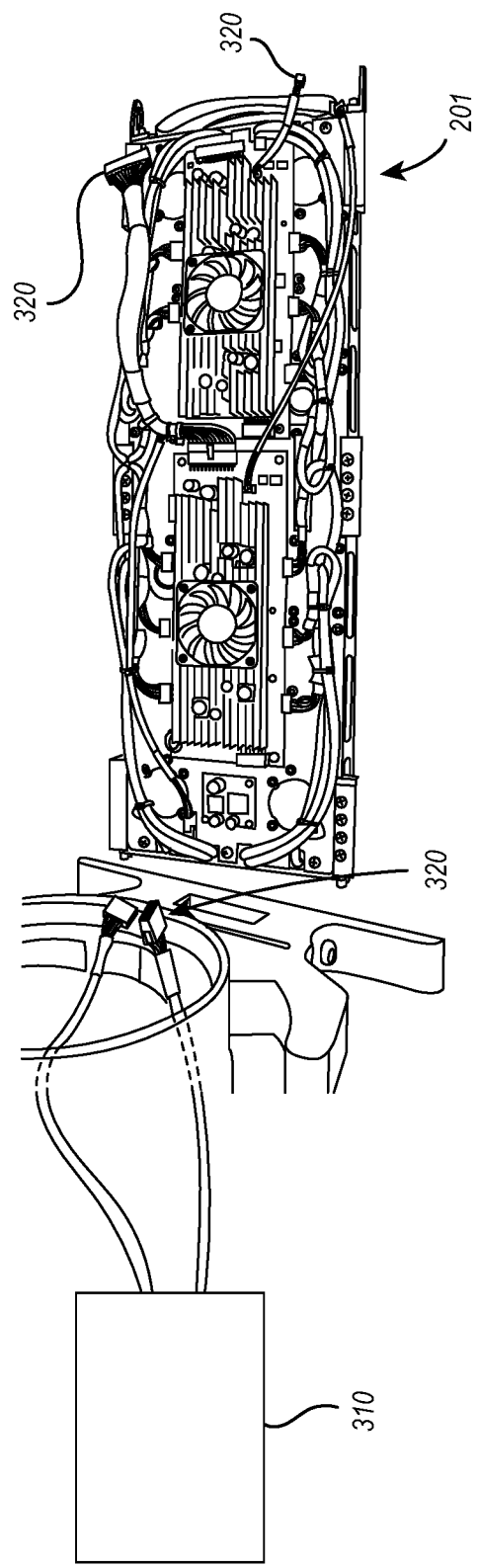
FIG. 3 illustrates various exemplary quick connect connection points for the removable battery tray of FIG. 2.

FIG. 3 illustrates various quick connect connection points 320 for connecting the removable battery tray 201 to the controls and power consuming components of the underwater vehicle 100. FIG. 3 illustrates a controller 310. The controller 310 may be, but is not limited to, a card, a microchip, separate hardware devices to control the removable battery tray 201, a combination of software and hardware, combinations thereof, or anything capable of interfacing with and/or managing communication with the removable battery tray. Moreover, the controller 310 may, establish a communication connection with the removable battery tray 201 through, but is not limited to, a hardwired connection, a wireless connection, or combinations thereof, wherein the wireless connection can be established on the underwater vehicle 100 or by a user in some location not directly proximate with the underwater vehicle 100. Thus, for example, embodiments may include decision-making logic that is external to the underwater vehicle for determining the chemistry of the battery tray 201 and/or determining how to charge the battery tray 201.

It should be noted that in some embodiments, the removable battery tray 201 includes firmware including information about the removable battery tray 201. In some embodiments, this firmware includes information identifying the type of chemistry of the battery tray. For example, this may include simply a code corresponding to the chemistry type. For example, in some embodiments, there may be four chemistry types available such that the chemistry type can be identified with a simple two bit binary code, allowing for four types of chemistries to be represented by selection of the code. The controller 310 is able to read the code and determine the type of battery chemistry for the removable battery tray 201.

This allows the controller 310 to use power provided by the removable battery tray 201 and/or charge the removable battery tray 201 according to constraints of the battery chemistry. In one embodiment, the controller 310 monitors the removable battery tray 201, thereby allowing fast charge capability with significant decreases to charge times. For example, monitoring may include monitoring temperatures of the battery tray 201, monitoring voltages across terminals of the battery tray 201, monitoring currents being supplied to the battery tray 201, monitoring thermal, electrical, or magnetic cut-off switches implemented in the battery tray 201, and/or monitoring other elements to determine if charging voltages and/or currents can be increased or should be decreased.

Figure 6:
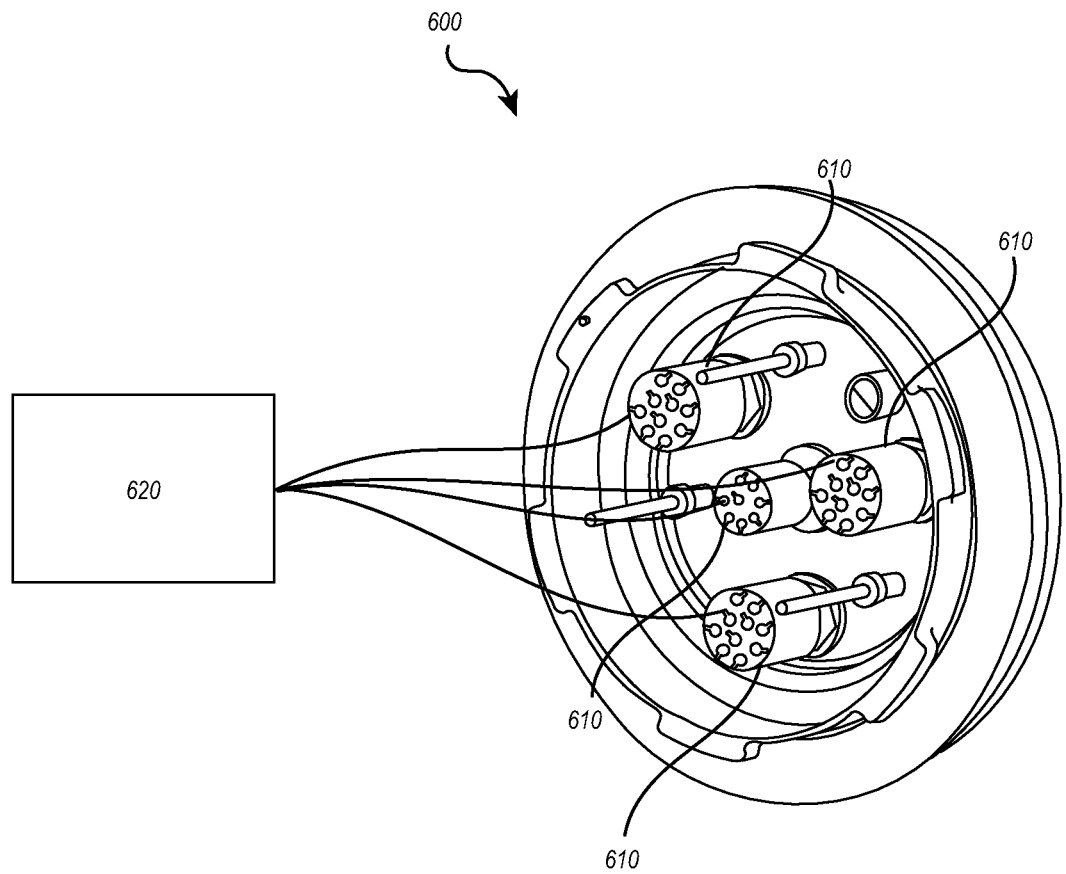
FIG. 6 illustrates an exemplary section connector.

In some embodiments, the modular battery system may include section connectors 610 (see FIG. 6) between the aft section 110, and the forward section 120 to connect the power of removable batteries to each other. That is, as discussed previously, a removable battery tray may be implemented in the aft section 110 and a separate removable battery tray may be included in the forward section 120. To allow for simultaneous usage and/or charging of the different battery trays, electrical conductors and connectors may be included to electrically couple the different battery trays to each other.

Unmanned Undersea Vehicle with an Optional Battery Section

Figure 4:
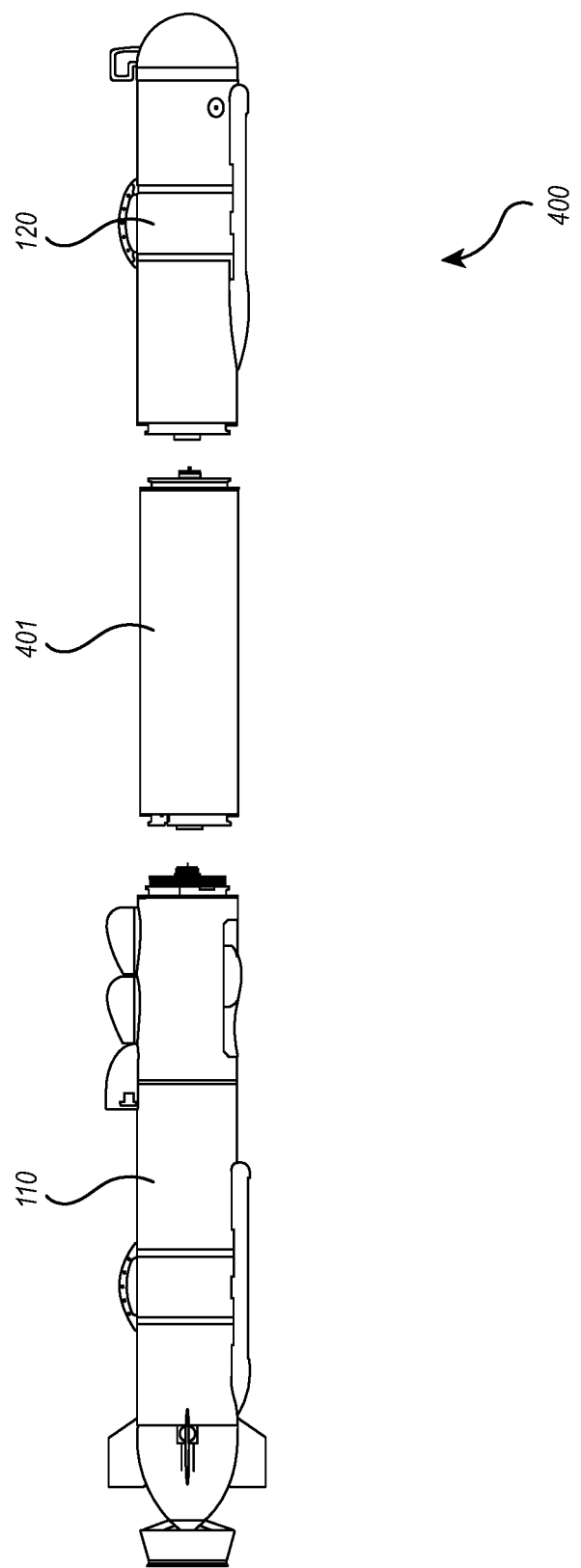
FIG. 4 illustrates a perspective view of an exemplary unmanned undersea vehicle with an optional battery section.

Referring now to FIG. 4, an exploded view of an underwater vehicle 400 is illustrated. In this particular embodiment, the modular battery system of the underwater vehicle 100 may incorporate an optional battery section 401 to create an underwater vehicle 400. In some embodiments, the optional battery section 401 may be connected to the aft section 110 by a joiner clamp 160. In some embodiments, the battery section 401 may be connected to the forward section 120 by a joiner clamp 160. In some embodiments, the inclusion of the optional battery section 401 offers a user greater flexibility and more options when evaluating the needs of a mission. It should be appreciated that in some embodiments the underwater vehicle 400 is not limited to the inclusion of a single battery section 401. Rather, in some embodiments, a plurality of battery sections 401 may be incorporated into the underwater vehicle 400.

However, by adding an optional battery section 401 to the underwater vehicle 400 may, in some embodiments, result in the underwater vehicle 400 being greater than 240 pounds, and/or being greater than 99 inches in length. For example, one embodiment of a battery section 401 is at least 30 inches in length, that when incorporated into an underwater vehicle 100 to create an underwater vehicle 400 may be greater than 99 inches in length.

In some embodiments, the underwater vehicle 400 may include a modular battery system that includes at least one removable battery tray 201, shown in FIG. 2, wherein the removable battery tray 201 is enclosed in section 150, section 170, section 180, the optional battery section 401, or any combination of sections 150, 170, 180, and the optional battery section 401. It should be appreciated that in some embodiments not all sections 150, 170, 180, and the optional battery section 401 will include removable battery trays 201. Rather, in some embodiments, only a single section will include a removable battery tray 201, and the other sections can include controls and/or a payload. Although, in some embodiments a given section can include both controls and/or payload and a battery tray.

In some embodiments, the modular battery system for an underwater vehicle 400 may include section connectors 610 (see FIG. 6) between the aft section 110, the optional battery section 401, and the forward section 120 to connect the power of the removable batteries 201 to each other.

Modular Battery System Connectors

The modular battery system may include section connectors 610 to connect the power of the removable batteries 201 to each attached section of the underwater vehicle 100 or 400. In some embodiments, the section connectors 610 may include female receptacle components (as shown) and/or mating male plug components. Female receptacle components typically incorporate conductive elements inside of non-accessible recesses to prevent dangerous human contact with charged conductive elements and/or shorting of electrical components by the contacting of metals or other conductive materials.

However, in some embodiments, the male plug contacts of a connector might ordinarily have accessible charged elements that can be dangerous to the user and/or be susceptible to shorting out the modular battery components, thereby causing damage to those components.

Thus, in some embodiments, the section connectors are 610 coupled to at least one control circuit 620 in such a way as to protect the removable batteries 201 and other power systems from shock hazards and accidental shorting. In some embodiments, this can be accomplished by de-energizing the section connectors 610 between the sections on the section connectors 610 that are attached to a mating connector. For example, once a female receptacle and a male plug have been coupled together, a charge can be applied to the section connectors 610. As the male plug has now been inserted into the female receptacle, access to the charged components by a human user and/or the possibility of shorting out components is virtually nonexistent, if not impossible.

The control circuit may detect connection in one or more of a number of different fashions. For example, the control circuit may be able to measure resistance, capacitance, inductance, or other characteristics (or differences over time) that indicate that an electrical connection has been made between different connectors. Once the control circuit 620 detects these connections, the connections can be energized.

Additionally, the section connectors 610 may connect in a watertight seal by using various rubber or other sealable components to prevent corrosion as result of contact with liquids or other corrosive materials.

In one embodiment, the section connectors 610 may be configured to make or break certain ground connections in a safe manner. In particular, it is desirable to make a ground connection before other connections are made, and to have the ground connection persist until other connections are terminated. Thus, in some embodiments, a section connector 610 may include an elongated ground pin that is longer than other pins on the section connector 610. Allowing the ground pin to make a connection to a mating female receptacle prior to other connections being made, and keeping the ground connection while other connections are terminated.

Some embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An underwater vehicle comprising:
   a water-tight sealed portion of the underwater vehicle;
   a modular battery system disposed in the water-tight sealed portion, further comprising:
   at least one removable battery tray; and
   a battery rail system configured to hold at least one removable battery tray; and
   wherein the modular battery system comprises a ballast control system with configurable ballast to cause the modular battery system to have a predetermined standard mass, when different battery chemistries are used to implement the removable battery tray, the predetermined standard mass selected and distributed along the ballast control system using a plurality of spaced holes along a rail, the rail for receiving the at least one removable battery tray, the holes configured to selectively receive weighted plugs, the spaced holes distributed along the ballast control system to affect underwater vehicle balance and to cause the underwater vehicle to be naturally level, when weighted plugs are selectively received, when deployed in a working environment.

2. The underwater vehicle of claim 1, further comprising an aft section and a forward section.

3. The underwater vehicle of claim 2, wherein at least one removable battery tray is enclosed within the aft section.

4. The underwater vehicle of claim 2, wherein at least one removable battery tray is enclosed within the forward section.

5. The underwater vehicle of claim 2, wherein at least one removable battery tray is enclosed within the aft section and at least one removable battery tray is enclosed within the forward section, wherein the at least one removable battery tray enclosed within the aft section is connected to the at least one removable battery tray enclosed within the forward section.

6. The underwater vehicle of claim 1, wherein the removable battery tray comprises a battery chemistry of nickel metal hydride rechargeable batteries.

7. The underwater vehicle of claim 1, further comprising an aft section, at least one additional battery section, and a forward section.

8. The underwater vehicle of claim 7, wherein at least one removable battery tray is enclosed within the additional battery section.

9. The underwater vehicle of claim 7, wherein at least one removable battery tray is enclosed within the aft section, at least one removable battery tray is enclosed within the forward section, and at least one removable battery tray is enclosed within the additional battery section, wherein the at least one removable battery tray enclosed within the aft section is connected to the at least one removable battery tray enclosed within the additional battery section, and the at least one removable battery tray enclosed within the additional battery section is connected to the at least one removable batter pack enclosed within the forward section.

10. The underwater vehicle of claim 1, further comprising a plurality of additional battery sections attached to each other.

11. The underwater vehicle of claim 1, wherein the removable battery tray comprises a battery chemistry of primary alkaline rechargeable batteries.

12. The underwater vehicle of claim 1, wherein the removable battery tray comprises a battery chemistry of lithium-ion rechargeable batteries.

13. The underwater vehicle of claim 1, further comprising a controller configured to communicate with the at least one removable battery tray, and configured to detect a battery chemistry of the at least one removable battery tray.

14. A modular battery system for an underwater vehicle comprising:
a battery rail system, configured to be placed in a section of the underwater vehicle, comprising at least one rail, and configured to hold at least one removable battery tray;
the at least one removable battery tray coupled to the battery tray system, the at least one removable battery tray configured to be selectively removable from the underwater vehicle by sliding the at least one removable battery tray along the at least one rail within the section of the underwater vehicle;
a ballast control system with configurable ballast to cause the modular battery system to have a predetermined standard mass, when different battery chemistries are used to implement the removable battery tray, the predetermined standard mass selected and distributed along the ballast control system using a plurality of spaced holes along the at least one rail, the at least one rail for receiving the at least one removable battery tray, the holes configured to selectively receive weighted plugs, the spaced holes distributed along the ballast control system to affect underwater vehicle balance and to cause the underwater vehicle to be naturally level, when weighted plugs are selectively received, when deployed in a working environment.

15. The modular battery system of claim 14, wherein the at least one removable battery tray comprises a battery chemistry of nickel metal hydride rechargeable batteries.

16. The modular battery system of claim 14, wherein the at least one removable battery tray comprises a battery chemistry of primary alkaline rechargeable batteries.

17. The modular battery system of claim 14, wherein the at least one removable battery tray comprises a battery chemistry of lithium-ion rechargeable batteries.

18. The modular battery system of claim 14, further comprising a controller configured to communicate with the at least one removable battery tray, and configured to detect a battery chemistry of the at least one removable battery tray.

19. The modular battery system of claim 18, wherein the controller is configured to detect the battery chemistry of the at least one removable battery tray by reading firmware of the at least one removable battery tray.

20. The underwater vehicle of claim 13, wherein the controller is configured to detect the battery chemistry of the at least one removable battery tray by reading firmware of the at least one removable battery tray.

* * * * *